US007389171B2

(12) United States Patent
Rupp

(10) Patent No.: US 7,389,171 B2
(45) Date of Patent: Jun. 17, 2008

(54) SINGLE VISION SENSOR OBJECT DETECTION SYSTEM

(75) Inventor: Jeffrey D. Rupp, Ann Arbor, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 449 days.

(21) Appl. No.: 10/707,569

(22) Filed: Dec. 22, 2003

(65) Prior Publication Data

US 2005/0137774 A1 Jun. 23, 2005

(51) Int. Cl.
*B60K 31/00* (2006.01)
(52) U.S. Cl. .................... 701/93; 701/96; 180/170; 340/436; 348/148
(58) Field of Classification Search ............ 701/96, 701/93, 1, 28, 33, 36, 65, 301, 95; 180/271, 180/170; 342/27; 340/901, 903, 988, 425.5, 340/426.16, 435, 500, 936, 436; 382/181, 382/286, 291; 348/118, 135, 148, 161
See application file for complete search history.

(56) References Cited

U.S. PATENT DOCUMENTS

| | | | |
|---|---|---|---|
| 5,529,139 A * | 6/1996 | Kurahashi et al. .......... 180/169 |
| 5,642,238 A * | 6/1997 | Sala ........................... 359/871 |
| 5,874,904 A | 2/1999 | Hirabayashi et al. |
| 6,049,171 A | 4/2000 | Stam et al. |
| 6,076,622 A * | 6/2000 | Chakraborty et al. ....... 180/169 |
| 6,134,497 A * | 10/2000 | Hayashi et al. ............... 701/70 |
| 6,185,499 B1 * | 2/2001 | Kinoshita et al. ............ 701/96 |
| 6,311,123 B1 * | 10/2001 | Nakamura et al. ............ 701/96 |
| 6,370,475 B1 * | 4/2002 | Breed et al. ................. 701/301 |
| 6,405,132 B1 * | 6/2002 | Breed et al. ................. 701/301 |
| 6,411,202 B1 * | 6/2002 | Gal et al. ................. 340/425.5 |
| 6,430,494 B1 * | 8/2002 | Inoue et al. ................... 701/96 |
| 6,459,982 B1 * | 10/2002 | Kobayashi et al. ........... 701/93 |
| 6,487,481 B2 * | 11/2002 | Tanaka et al. ................. 701/41 |
| 6,498,620 B2 * | 12/2002 | Schofield et al. ............ 348/148 |
| 6,560,525 B1 * | 5/2003 | Joyce et al. ................... 701/96 |
| 6,567,737 B2 * | 5/2003 | Nakamura et al. ............ 701/96 |
| 6,587,760 B2 * | 7/2003 | Okamoto ....................... 701/1 |
| 6,625,540 B2 * | 9/2003 | Kageyama .................. 701/301 |
| 6,684,149 B2 * | 1/2004 | Nakamura et al. ............ 701/96 |
| 6,708,099 B2 * | 3/2004 | Tellis et al. ................... 701/96 |
| 6,728,617 B2 * | 4/2004 | Rao et al. ..................... 701/45 |
| 6,732,021 B2 * | 5/2004 | Matsumoto et al. ........... 701/1 |
| 6,794,987 B2 * | 9/2004 | Schiffmann et al. ........ 340/435 |

(Continued)

OTHER PUBLICATIONS

High performance sensor fusion architecture for vision-based occupant detection, Owechko, Y.; Srinivasa, N.; Medasani, S.; Boscolo, R.; Intelligent Transportation Systems, 2003. Proceedings. 2003 IEEE, vol. 2, Oct. 12-15, 2003 pp. 1128-1133 vol. 2.*

(Continued)

*Primary Examiner*—Cuong Nguyen
(74) *Attorney, Agent, or Firm*—Frank MacKenzie

(57) ABSTRACT

A sensing system (10) for a vehicle (12) includes a single vision sensor (14) that has a position on the vehicle (12). The single vision sensor (14) detects an object (40) and generates an object detection signal. A controller (16) is coupled to the vision sensor (14) and generates a safety system signal in response to the position of the vision sensor (14) and the object detection signal.

11 Claims, 3 Drawing Sheets

U.S. PATENT DOCUMENTS

| | | |
|---|---|---|
| 6,819,779 B1 * | 11/2004 | Nichani .................... 382/104 |
| 6,958,683 B2 * | 10/2005 | Mills et al. ................ 340/436 |
| 7,158,015 B2 * | 1/2007 | Rao et al. .................. 340/436 |
| 2001/0056326 A1 * | 12/2001 | Kimura ..................... 701/208 |
| 2002/0016663 A1 * | 2/2002 | Nakamura et al. ........... 701/96 |
| 2002/0024713 A1 * | 2/2002 | Roberts et al. ............. 359/267 |
| 2002/0026274 A1 * | 2/2002 | Morizane et al. ........... 701/93 |
| 2002/0032515 A1 * | 3/2002 | Nakamura et al. ........... 701/96 |
| 2002/0138192 A1 * | 9/2002 | Lueder et al. .............. 701/93 |
| 2002/0198632 A1 * | 12/2002 | Breed et al. ................. 701/1 |
| 2003/0004644 A1 * | 1/2003 | Farmer ..................... 701/301 |
| 2003/0060980 A1 * | 3/2003 | Prakah-Asante et al. .... 701/301 |
| 2003/0097206 A1 * | 5/2003 | Matsumoto et al. ........... 701/1 |
| 2003/0105578 A1 * | 6/2003 | Takenaga et al. ........... 701/117 |
| 2003/0120414 A1 * | 6/2003 | Matsumoto et al. .......... 701/96 |
| 2003/0217880 A1 * | 11/2003 | Isogai et al. ................ 180/170 |
| 2004/0000991 A1 * | 1/2004 | Schiffmann et al. ........ 340/435 |
| 2004/0016870 A1 * | 1/2004 | Pawlicki et al. ......... 250/208.1 |
| 2004/0019420 A1 * | 1/2004 | Rao et al. ..................... 701/45 |
| 2004/0117090 A1 * | 6/2004 | Samukawa et al. ........... 701/45 |
| 2004/0143380 A1 * | 7/2004 | Stam et al. ................... 701/36 |
| 2004/0145457 A1 * | 7/2004 | Schofield et al. ......... 340/425.5 |
| 2004/0234136 A1 * | 11/2004 | Zhu et al. ................... 382/224 |
| 2005/0017857 A1 * | 1/2005 | Rao et al. .................... 340/435 |
| 2005/0073396 A1 * | 4/2005 | Mills et al. ................. 340/435 |
| 2005/0080528 A1 * | 4/2005 | Obradovich ................ 701/36 |
| 2005/0137774 A1 * | 6/2005 | Rupp ......................... 701/96 |

OTHER PUBLICATIONS

IEEE IV2003 Intelligent Vehicles Symposium. Proceedings (Cat. No. 03TH8683), Intelligent Vehicles Symposium, 2003. Proceedings. IEEE Jun. 9-11, 2003, Digital Object Identifier 10. 1109/IVS. 2003.1212870.*

* cited by examiner

SINGLE VISION SENSOR OBJECT DETECTION SYSTEM

BACKGROUND OF INVENTION

The present invention relates to vehicle sensing systems. More particularly, the present invention relates to a method and system for performing object detection utilizing a single vision sensor.

Various sensing systems currently exist for performing collision warning and countermeasure system operations, such as detection, classification, tracking, and relative distance and velocity estimation of objects within a close proximity of a host vehicle. Sensing systems also exist for performing other sensing system operations, such as occupant related operations and adaptive cruise control operations.

Collision warning and countermeasure system operations include providing a vehicle operator knowledge and awareness of vehicles and objects that are within a close proximity of the host vehicle to prevent colliding with those objects. Countermeasure systems exist in various passive and active forms. Some countermeasure systems are used to aid in the prevention of a collision, others are used to aid in the prevention of injury to a vehicle operator.

Certain collision warning and countermeasure systems are able to sense an object within a close proximity of the host vehicle and warn the host vehicle operator such that the operator can take precautionary steps to prevent a collision or injury. Other collision warning and countermeasure systems activate passive or active countermeasures such as airbags, load limiting seatbelts, or brake control whereby the system itself aids in the prevention of a collision or an injury.

Occupant related operations include the detection of occupant characteristics, the determination of which safety system countermeasures to perform, and the adjustment of deployment or enablement times and rates of the countermeasures. Example countermeasures that may be enabled are seat belt pretensioners and airbags. Occupant characteristics may include occupant positioning within a seat, occupant size, or other known occupant characteristics.

Adaptive cruise control operations include adjusting a host vehicle traveling speed to maintain a safe operating distance between the host vehicle and a target vehicle. Other similar sensing systems also exist, such as lane departure and lane-keeping systems, which monitor lane markers or roadway lane designating lines and provide warnings when the host vehicle is not maintaining travel within a current operating lane.

The various sensing systems may be ultrasonic, radar, lidar, or vision-based. In order to perform each of the various sensing system tasks many of the stated sensors are distributed throughout the host vehicle. Not only does each of the sensors increase vehicle manufacturing and maintenance costs, but in order to perform object detection and assessment multiple sensors are needed.

Also, various techniques have been utilized, such as triangulation, in determining range, velocity, acceleration, and identification of objects in relation to a host vehicle. Typically, two or more cameras are used to determine the stated parameters, potentially further increasing the number of sensors used.

One technique, that is used to reduce the number of sensors within a host vehicle, uses vision sensors and performs optical flow visual image processing to estimate range of a target. In essence the technique infers three-dimensional characteristics from two-dimensional information. Other image processing techniques assume target size, based on a known range of vehicle sizes, and estimate range, based on the assumed size or an apparent two-dimensional size and image pixel intensity. The stated techniques tend to be inaccurate due to the assumptions and estimations contained therein.

Thus, there exists a need for an improved sensing system that decreases the number of sensors to perform object detection and determines object parameters associated with the detected objects. Reduction in the number of sensors can aid in reducing the number of related vehicle components, system complexity, and vehicle manufacturing and maintenance costs.

SUMMARY OF INVENTION

The present invention provides a method and system for performing object detection and safety system operations within a vehicle. A sensing system for a vehicle is provided and includes a single vision sensor that has a position on the vehicle. The vision sensor detects an object and generates an object detection signal. A controller is coupled to the vision sensor and generates a safety system signal in response to the position of the vision sensor and the object detection signal.

The embodiments of the present invention provide several advantages. One of several of these advantages is the provision of a sensing system that is capable of determining object parameters relative to a host vehicle through use of a single vision sensor. In so doing, the present invention minimizes the number of sensors and related system components needed to perform multiple safety system operations. The present invention is capable of performing the safety system operations that are traditionally performed through use of multiple vision sensors.

Another advantage of the present invention is that it provides a sensing system that utilizes a single vision sensor, but provides accurate measurements for improved sensing system performance.

Furthermore, the present invention is capable of determining object parameters without assuming actual size of a target to estimate or determine range of the target.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be made to embodiments illustrated in greater detail in the accompanying figures and described below by way of examples of the invention wherein.

DETAILED DESCRIPTION

While the present invention is described with respect to a system and method of performing safety system operations within a vehicle, the present invention may be adapted and applied to various systems including: collision warning systems, collision avoidance systems, parking-aid systems, reversing-aid systems, passive countermeasure systems, adaptive cruise control systems, lane departure systems, lane-keeping systems, windshield clearing systems, or other systems known in the art.

In the following description, various operating parameters and components are described for multiple constructed embodiments. These specific parameters and components are included as examples and are not meant to be limiting.

Additionally, in the following description, the term "performing" may include activating, deploying, initiating, powering, and other terms known in the art that may describe the manner in which a countermeasure or a comfort and convenience feature may be operated.

As well, in the following description, various countermeasures are discussed. The countermeasures may be reversible or irreversible. Reversible countermeasures refer to countermeasures that may be reset to their original form or used repeatedly without a significant amount of functional deficiency, which may be determined by a system designer. Irreversible countermeasures refer to countermeasures such as airbags that, once deployed, are not reusable.

Furthermore, a countermeasure signal may include information pertaining to the above-stated reversible and irreversible countermeasures or may include other information, such as collision warning information, and parking-aid or reversing-aid countermeasure information. For example, the countermeasure signal may contain object detection information, which may be used to indicate to a vehicle operator the presence or close proximity of a detected object.

In addition, the term "object" may refer to any animate or inanimate object. An object may be a vehicle, a pedestrian, a lane marker, a road sign, a roadway lane designating line, a vehicle occupant, or other object known in the art.

Also, although the present invention is primarily described with respect to a single sensor, in applications where a single sensor is infeasible or undesirable additional sensors may be utilized and may be utilized in a similar fashion.

Figure 1:
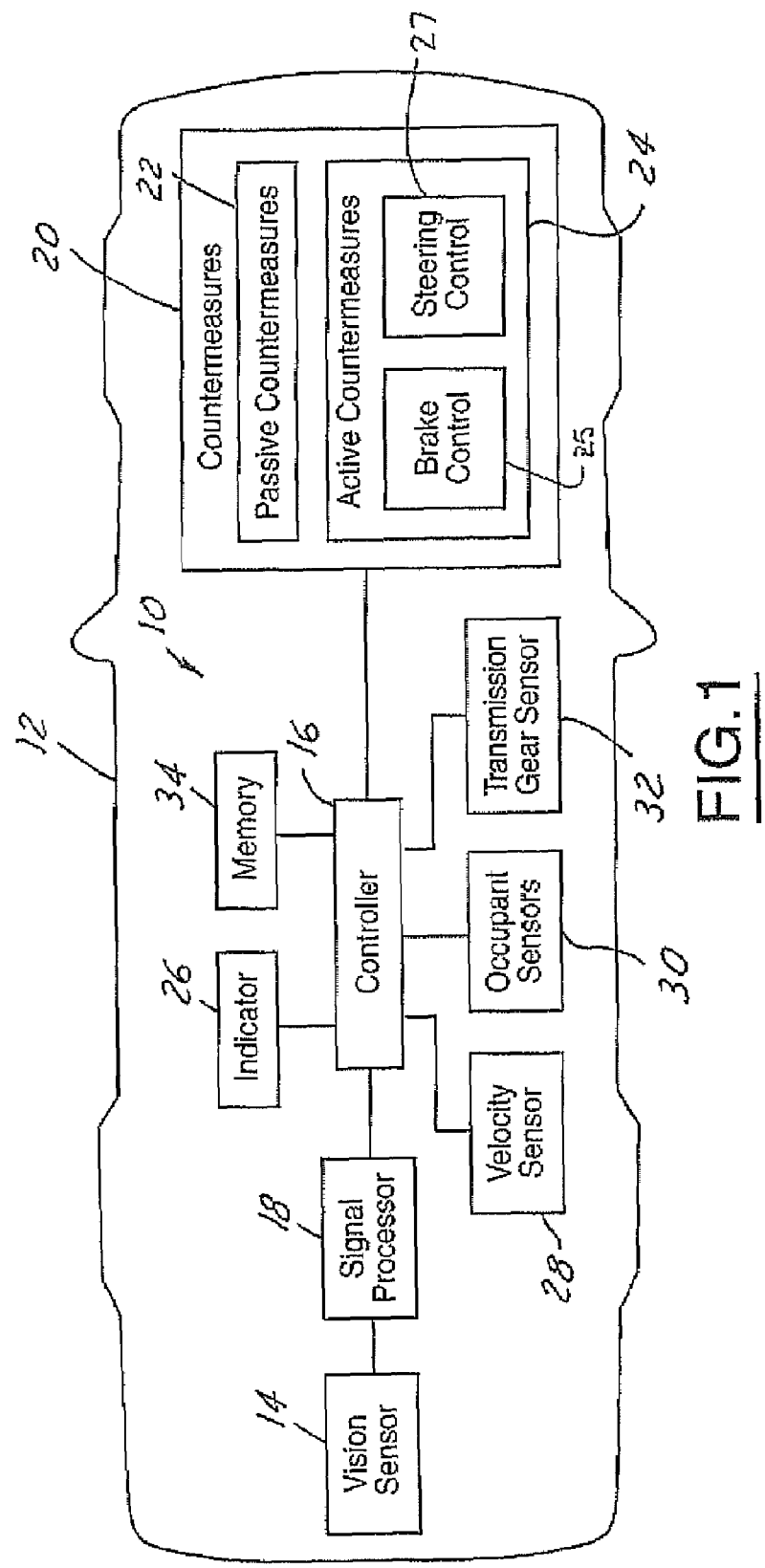
FIG. 1 is a block diagrammatic view of a safety system for a vehicle in accordance with an embodiment of the present invention.

Referring now to FIG. 1, a block diagrammatic view of a safety system 10 for a vehicle 12 in accordance with an embodiment of the present invention is shown. The safety system 10 may perform as a sensing system, an adaptive cruise control system, a countermeasure system, or other safety system known in the art. The safety system 10 includes a single vision sensor 14 that has an associated position on the vehicle 12. The vision sensor 14 detects objects within proximity of the vehicle 12. The vision sensor 14 is coupled to a controller 16, which determines object related parameters in response to the position of and signals received from the vision sensor 14. The controller 16 in response to the object parameters also performs various other safety system operations or tasks.

The vision sensor 14 is coupled to a signal processor 18, which in turn is coupled to the controller 16. The signal processor 18 formats object detection signals generated by the vision sensor 14 for further processing by the controller 16. The vision sensor 14 may be a camera, a charged-coupled device, an infrared detector, a sensor formed of a series of photodiodes, a complementary metal-oxide semiconductor, or other vision sensor known in the art. In one embodiment of the present invention, the vision sensor 14 is a two-dimensional camera. The vision sensor 14 may be located in various locations on the vehicle 12.

The signal processor 18 receives and converts the object detection signals, generated by the vision sensor 14, into a proper format for reception by the controller 16. The signal processor 18 may include analog-to-digital converters, filters, or amplifiers, as well as other signal conditioning components known in the art. The signal processor 18 may be part of the vision sensor 14, the controller 16, may be a stand-alone device, as shown, or may be some combination thereof.

The controller 16 may be microprocessor based such as a computer having a central processing unit, memory (RAM and/or ROM), and associated input and output buses. The controller 16 may be an application-specific integrated circuit or be formed of other logic devices known in the art. The controller 16 may be a portion of a central vehicle main control unit, an interactive vehicle dynamics module, a restraints control module, a main safety controller, or may be a stand-alone controller as shown.

The controller 16 may perform various different sensing system operations including adaptive cruise control, lane-keeping control, lane-departure control, collision avoidance control, countermeasure control, or other sensing system operations known in the art. The operations may be performed sequentially or simultaneously.

Adaptive cruise control is used for the monitoring of objects forward of the vehicle 12 and for the maintaining of a safe predetermined distance away from the detected objects to prevent a collision therewith. When adaptive cruise control is active the controller 16 may warn a vehicle operator of an impending object or perform a countermeasure as to alter the speed of travel of the vehicle 12.

Lane-keeping and lane-departure control refer to when the controller 16 monitors lane markings or roadway lane designating lines and warns the vehicle operator when the vehicle 12 is exiting a current lane of travel or is directed to exit the current lane of travel. The controller 16 may perform a countermeasure, such as one of the countermeasures 20, to maintain the current lane of travel. For example, the controller 16 may control vehicle steering to adjust the direction of travel of the vehicle 12.

Countermeasure control may include occupant related operations, such as detecting occupant characteristics, determining which of the countermeasures to perform, and adjusting times and activating rates of the countermeasures 20. The occupant characteristics may include occupant positioning within a seat, occupant size, or other known occupant characteristics.

The countermeasures 20 may include passive countermeasures 22 and active countermeasures 24. The controller 16 as part of a countermeasure may generate a warning signal and communicate the warning signal to vehicle occupants via the indicator 26.

The passive countermeasures 22 may include internal air bag control, seatbelt control, knee bolster control, head restraint control, load limiting pedal control, load limiting steering control, pretensioner control, external air bag control, pedestrian protection control, and other passive countermeasures known in the art.

The active countermeasures 24 may include brake control 25 and steering control 27, as shown. The active countermeasures may also include throttle control, suspension control, transmission control, and other vehicle system controls known in the art. The controller 16 may signal the vehicle operator via the indicator 26 of an impending potential collision so that the vehicle operator may actively perform a precautionary action, such as applying the brakes or steering to prevent a collision.

The indicator 26 is used to signal or indicate a safety system signal, which may include a warning signal, an adaptive cruise control signal, a collision-warning signal, a countermeasure signal, or an object identification signal in response to the object detection signals. The indicator 26 may include a video system, an audio system, an LED, a light, a global positioning system, a heads-up display, a headlight, a taillight, a display system, a telematic system, or other indicator known in the art. The indicator 26 may supply warning signals, collision-related information, lane departure and lane-keeping information, external-warning signals to objects or pedestrians located outside of the vehicle 12, or other pre and post collision information.

The controller 16 determines which of the sensing system operations to perform. The controller 16 while performing one or more of the sensing system operations may determine whether to perform one or more of the countermeasures 20 and indicate to the vehicle operator various object and vehicle status information. Depending upon the relative positions, velocities, and accelerations of the detected objects, the controller 16 may also determine whether to indicate to the vehicle operator of a potential collision or may perform a countermeasure, as needed, to prevent a collision, mitigate a potential injury, or prevent the vehicle 12 from traveling outside a current lane of travel.

Various other vehicle and occupant sensors may be coupled to the controller 16 for determining whether to perform the various safety system tasks. The sensors may include a velocity sensor 28, a transmission gear sensor 32, occupant sensors 30, as shown, or other sensors known in the art. The velocity sensor 28 may be utilized to determine the relative range rate of an object. The transmission gear sensor 32 may be utilized to determine the traveling direction of the vehicle 12. The occupant sensors 30 may be utilized to identity and determine occupant characteristics, such as the size and position of an occupant within the vehicle 12.

A memory 34 may be coupled to the controller 16 for storing various vehicle, object, and occupant related information. The memory 34 may be part of the vision sensor 14, the controller 16, may be a stand-alone device, as shown, or may be a combination thereof. The memory 34 may, for example, store position information related to the vision sensor 14. The position information of the vision sensor 14 is used by the controller 16 in determining object related parameters, which are described in further detail below.

The safety system 10 may be located in various locations in the vehicle 12. The safety system 10 may be located within an overhead console, near any vehicle window, near a vehicle bumper, in or behind a vehicle dashboard, internal to or external from a vehicle cabin, or in various other locations known in the art.

Figure 2:
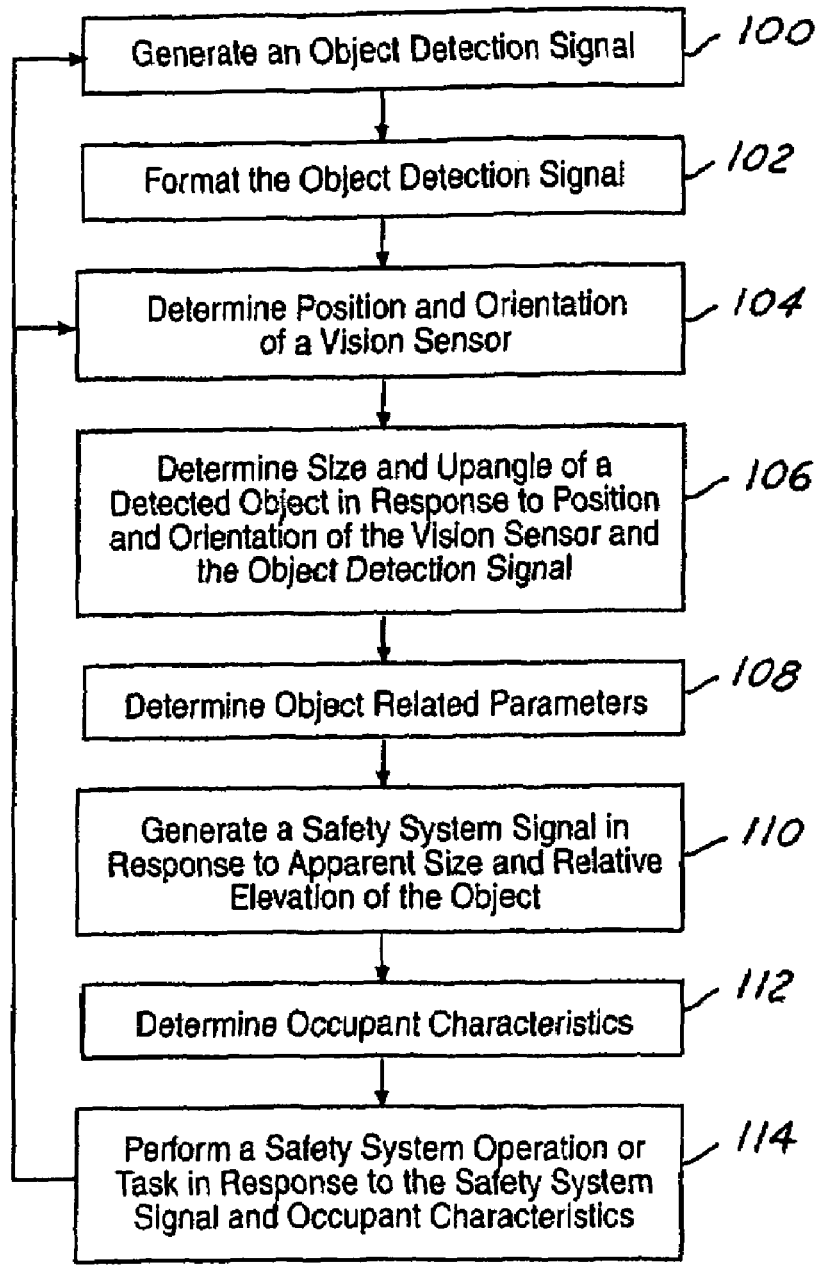
FIG. 2 is a logic flow diagram illustrating a method of performing safety system operations within a vehicle in accordance with an embodiment of the present invention.
Figure 3A:
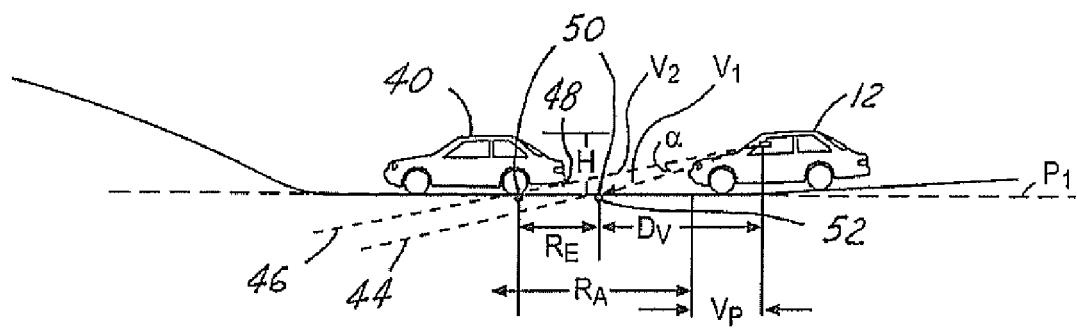
FIG. 3A is a side view of the vehicle utilizing the safety system of FIG. 1 and detecting an object in the same elevation as the vehicle in accordance with an embodiment of the present invention.
Figure 3B:
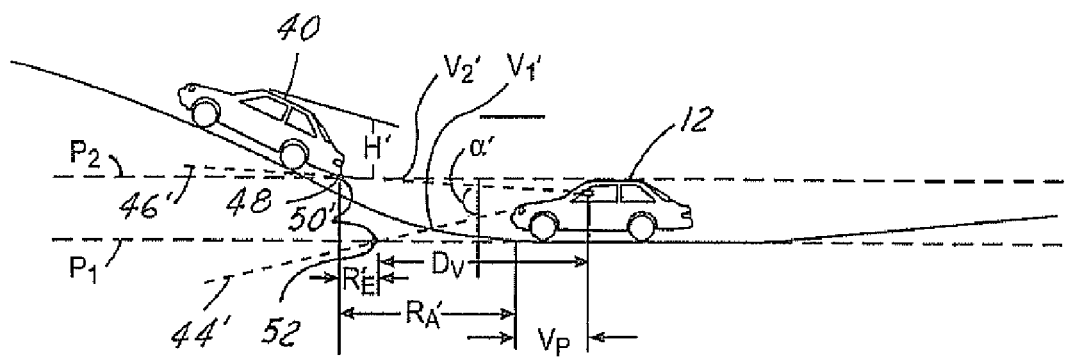
FIG. 3B is a side view of the vehicle utilizing the safety system of FIG. 1 and detecting an object in a different elevation as the vehicle in accordance with an embodiment of the present invention.

Referring now to FIGS. 2, 3A, and 3B, a logic flow diagram illustrating a method of performing safety system operations within the vehicle 12 and side views of the vehicle 12 and a detected object 40 are shown in a first state and in a second state, respectively, according to the embodiments of the present invention.

In step 100, the vision sensor 14 detects the object 40 and generates an object detection signal. In step 102, the signal processor 18 converts, modifies, and formats the object detection signal for the reception by the controller 16. The signal processor 18 may, for example, include an analog-to-digital converter to convert analog image signals into a digital format.

In step 104, the controller 16 determines the position and the orientation of the vision sensor 14 within and relative to a fixed reference point or set of reference points on the vehicle 12. In the embodiment of FIGS. 3A and 3B, a fixed reference point 42 is shown and represents a hoodline of the vehicle 12. The vision sensor 14, for the embodiment of FIGS. 3A and 3B, is mounted within an overhead console (not shown) of the vehicle 12 and position thereof is determined relative to the hoodline 42 of the vehicle 12. The position and orientation of the vision sensor 14 may be determined during the operation of the vehicle 12 or may be in the form of predetermined values that are stored in the memory and accessible by the controller 16.

In step 106, the controller 16 determines the size and the up-angle of the object 40 in response to the position of the vision sensor 14 and the object detection signal. Up-angles $\alpha$ and $\alpha''$ correspond to the object 40 in states 1 and 2, respectively. The up-angles $\alpha$ and $\alpha''$ have a first vector and a second vector, which are designated by $V_1$ and $V_2$ in FIG. 3A and $V_1''$ and $V_2''$ in FIG. 3B. The first vectors $V_1$ and $V_1''$ correspond to line segments 44 that extend through the vision sensor 14 and the hoodline 42. The second vectors $V_2$ and $V_2''$ correspond to line segments 46 that extend through the vision sensor 14 and a lower detected point 48 on the object 40. Of course, the up-angle may be determined using a point on the object 40.

Notice in the embodiment of FIG. 3A that the vehicle 12 and the object 40 are at the same elevation or are on the same vertical plane $P_1$ and that the object 40 has a determined apparent height H. The vertical or driving plane of a vehicle is typically horizontal. The following steps describe change in the driving plane in a vertical direction. For example, a target in the same horizontal plane that moves away from a host vehicle may appear to rise vertically in an imaging view. Note that the driving planes of a target and of a host vehicle are not necessarily horizontal and may not be parallel. It is the transition from when the target and the host vehicle are on the same vertical plane to when they are on different vertical planes that are of interest. During the transition, change in image size reveals whether the vertical rise of the target, within the imaging view, is due to an increase in range of the target or whether the target has merely moved onto a driving plane that is rising relative to the driving plane of the host vehicle.

In FIG. 3B, the vehicle 12 and the object 40 are in different vertical planes $P_1$ and $P_2$ and the object 40 has an apparent height H'' that is different from apparent height H. The apparent height of the object 40 is different between state 1 and state 2 due to the object moving up a hill and altering the elevation or vertical plane by which it exists, thus, changing in apparent height.

In step 108, the controller 16 in response to the determined size and up-angle of the object 40 determines object related parameters, such as relative actual range and range rate of the object 40. The controller 16 is capable of determining the object related parameters from two-dimensional or three-dimensional information collected from the vision sensor 14. Height, width, and up-angle of the object 40 can be determined having just two-dimensional information from the vision sensor 14. The controller 16 initially or as an assumed default determines that the vehicle 12 and the object 40 are on the same vertical plane and monitors relative size and movement of the object 40 to determine whether this assumed default is true, and adjusts the operation accordingly. For example, after collecting and comparing a couple of frames of data the controller 16 is able to better determine vertical position of the object 40 relative to the vehicle 12.

Distance between intersection points 50 for each vector pair $V_1$, $V_2$ and $V_1'$, $V_2'$ are referred to as estimated ranges $R_E$ and $R_E'$ of the object 40. The intersection points 50 correspond with the intersection of each line segment 44, 44', 46, and 46' with the planes $P_1$ and $P_2$. A relatively fixed horizontal distance $D_V$ exists between the horizontal position of the position sensor 14 and the intersection points 52 where the first vectors $V_1$ and $V_2$ intersect the plane $P_1$. When the position sensor 14 is located in an upper portion of the vehicle 12, such as in the overhead console, horizontal distance $D_V$ is approximately the same for various inclined roads, due to the high positioning of the vision sensor 14. Thus, horizontal distance $D_V$ is approximately the same for both state 1 and state 2 and is designated as such.

Relative actual range $R_A$ of the object 40, with respect to the vehicle 12, may be determined by adding the estimated range $R_E$ with the fixed distance $D_V$ and subtracting a horizontal distance Vp between the vision sensor 14 and the hoodline 42. Relative actual ranges $R_A$ and $R_A'$ for states 1 and 2 are represented by equations 1 and 2, respectively.

$$R_A = R_E + D_V V_P \quad (1)$$

$$R_A' = R_E' + D_V V_P \quad (2)$$

As the object 40 becomes relatively closer or farther away from the vehicle 12 the apparent size of the object 40 increases or decreases in size accordingly. When using a two-dimensional sensor, size may refer to height and width of the object. The object 40 may appear to rise in elevation when the vision sensor 14 is situated in a higher vertical position than the object 40 and distance between the object 40 and the vehicle are increasing. When the size of the object 40 appears not to change between collected frames of information, but the object 40 appears to be moving upward or downward then the controller 16 may determine that the vertical plane of the object 40 is changed. Actual range of the object 40 is altered according to the change in the vertical plane of the object 40. When the size of the object 40 does appear to change than the controller 16 may determine that the actual range has also changed.

The situation also exists where the vehicle 12 and the object 40 exist on different planes, such that the vertical relative position of the object 40 is unaltered, but yet the distance between the vehicle 12 and the object 40 is changed. In this situation, the controller 16 monitors and determines that the size of the object 40 is changed and in response thereto determines change in the actual range.

In step 110, the controller 16 generates safety system signals in response to the apparent size and relative elevation of the object 40. The controller 16 may also generate the safety system signals in response to other known object related parameters.

In step 112, the controller 16 may determine occupant characteristics using the occupant sensors 30. Step 112 may be performed simultaneously with step 110, whereby, the controller 16 generates or modifies the safety system signals in response to the determined occupant characteristics.

In step 114, the controller 16 may perform a countermeasure 20 in response to the safety system signals. Performance of the countermeasure 20 safety system signal may be in response to any of the object related parameters, the occupant characteristics, other parameters known in the art, alone or in a combination thereof. The controller 16 may perform a countermeasure operation, an adaptive cruise control operation, or any of the other above-mentioned or known in the art safety system operations or tasks in response to the safety system signal. In one embodiment of the present invention, the controller 16, as part of an adaptive cruise control function, reduces the speed of the vehicle 12 to avoid colliding with the object 40. The controller 16 returns to step 100 or 104 to detect additional objects and further monitor any detected objects that are of concern.

The above-described steps are described with respect to the vertical and horizontal positioning of an object relative to a vehicle; they may be easily modified to also perform operation with respect to lateral positioning of the object relative to the vehicle. Also, although the above-described steps are described with respect to determining up-angle of a detected object, other angles may be utilized in determining object related parameters. The above-described steps are also meant to be illustrative examples; the steps may be performed sequentially, synchronously, simultaneously, or in a different order depending upon the application.

The present invention provides an accurate safety system for a vehicle that is capable of determining object parameters, such as object range and range rate, utilizing a single vision sensor. The present invention in utilizing a single vision sensor minimizes the number of sensors and sensing system components within a vehicle, minimizes sensing system complexity, and minimizes manufacturing and maintenance costs involved therein.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. A method of initiating safety system operations onboard a vehicle, said method comprising the steps of:
    (a) determining position coordinates of a single vision sensor relative to determined reference point coordinates onboard said vehicle;
    (b) detecting at least one object proximate said vehicle with said single vision sensor and accordingly generating at least one object detection signal;
    (c) determining at least one characteristic of an occupant onboard said vehicle with at least one occupant sensor and accordingly generating at least one occupant characteristic signal; and
    (d) generating a safety system signal in response to said position coordinates of said single vision sensor, said at least one object detection signal, and said at least one occupant characteristic signal.

2. A method as in claim 1, wherein step (a) is at least partially accomplished by determining relative vertical positioning of said single vision sensor relative to said reference point coordinates.

3. A method as in claim 1, wherein said method further comprises the steps of:
    initially determining, as an assumed default, each said object to be at a same elevation as said vehicle; and
    generating each said object detection signal in response to each such initial determination.

4. A method as in claim 1, wherein said method further comprises the step of reducing a traveling speed of said vehicle when a vision-sensed height and width of said object appear to increase in size.

5. A method as in claim 1, wherein said method further comprises the step of determining each said object to be at a different elevation than said vehicle when said object appears to maintain a same height and width but change in vertical position.

6. A method as in claim 1, wherein said method further comprises the steps of determining object parameters and generating said safety system signal in response to said object parameters.

7. A method as in claim 6, wherein the step of determining object parameters is at least partially accomplished by determining an up-angle of each said object.

8. A method as in claim 6, wherein the step of determining object parameters is at least partially accomplished by determining a size and an up-angle of each said object and, in response thereto, determining a range of said object.

9. A method as in claim 6, wherein the step of determining object parameters is at least partially accomplished by determining at least one parameter selected from the group consisting of object range, range rate, height, width, size, and acceleration.

10. A method as in claim 1, wherein the step of generating a safety system signal at least partially includes generating an adaptive cruise control signal.

11. A method as in claim 1, wherein said method further comprises the steps of determining an orientation of said single vision sensor and also generating said safety system signal in response to said orientation.

* * * * *